United States Patent [19]

Monnet

[11] 4,052,497

[45] Oct. 4, 1977

[54] METHOD OF INJECTION-MOULDING BY INJECTION OF AN ARTICLE COMPOSED OF AT LEAST THREE DIFFERENT MATERIALS

[75] Inventor: Bernard Léon Monnet, Bellignat, France

[73] Assignee: Billion S.A., Oyonnax, France

[21] Appl. No.: 683,384

[22] Filed: May 5, 1976

Related U.S. Application Data

[62] Division of Ser. No. 508,567, Sept. 23, 1974, Pat. No. 3,976,226.

[30] Foreign Application Priority Data

Sept. 21, 1973 France ............................. 73.34011

[51] Int. Cl.² ................................................. B29F 1/03
[52] U.S. Cl. .................................... 264/255; 264/245; 264/328
[58] Field of Search ................ 264/328, 329, 245, 255

[56] References Cited

U.S. PATENT DOCUMENTS

| 2,418,856 | 4/1947 | Stacy | 18/30 |
|---|---|---|---|
| 3,221,373 | 12/1965 | Kwan | 264/245 X |
| 3,513,060 | 5/1970 | Krystof | 264/245 X |
| 3,716,612 | 2/1973 | Schrenk | 264/329 X |
| 3,764,642 | 10/1973 | Boutillier | 264/47 |
| 3,793,415 | 2/1974 | Smith | 264/255 X |
| 3,873,656 | 3/1975 | Garner | 264/328 X |
| 3,894,823 | 7/1975 | Hanning | 264/329 X |
| 3,906,066 | 9/1975 | Barrie | 264/328 X |
| 3,947,177 | 3/1976 | Eckart | 425/244 |

FOREIGN PATENT DOCUMENTS

| 1,177,326 | 2/1964 | Germany | 264/245 |
|---|---|---|---|
| 965,442 | 6/1957 | Germany | 425/133.1 |
| 1,015,341 | 9/1957 | Germany | 425/133.1 |
| 354,837 | 8/1931 | United Kingdom | 222/132 |

*Primary Examiner*—Richard R. Kucia
*Attorney, Agent, or Firm*—Finnegan, Henderson, Farabow & Garrett

[57] ABSTRACT

The invention relates to a method for the manufacture by injection molding of articles composed of a plurality of layers of at least three distinct materials coated one over the other, the method comprising the steps of successive injection of a measured quantity of a first material adapted to form the skin of the article, a measured quantity of a second material to form the intermediate layer, and a measured quantity of a third material to form the body of the article, the materials being introduced into the mold coaxially so as to give a uniform distribution. The invention is especially applicable to the production of articles in which the external and internal materials are joined together by an intermediate material.

2 Claims, 2 Drawing Figures

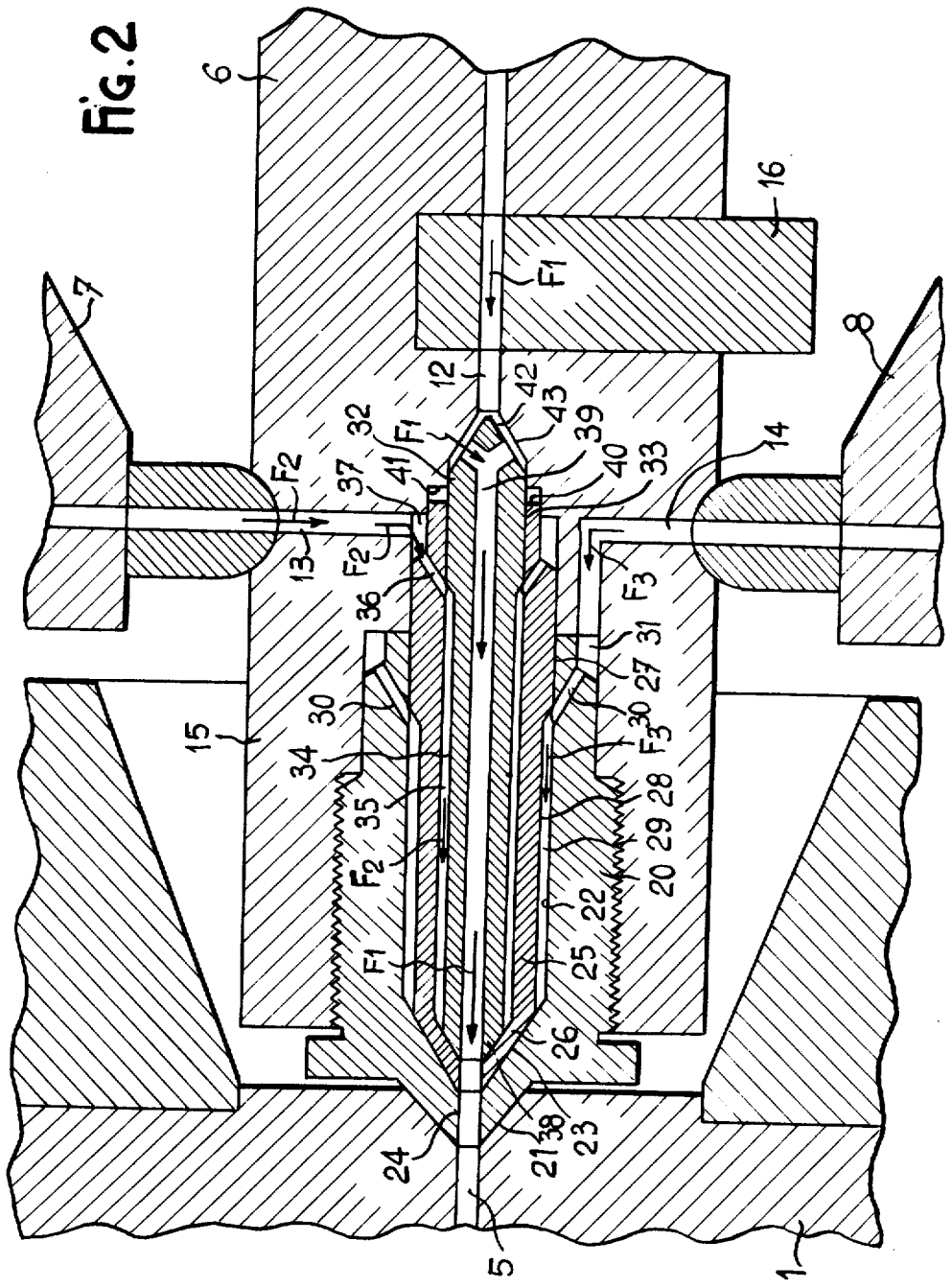

METHOD OF INJECTION-MOULDING BY INJECTION OF AN ARTICLE COMPOSED OF AT LEAST THREE DIFFERENT MATERIALS

This is a continuation, division of application Ser. No. 508,567, filed Sept. 23, 1974 U.S. Pat. No. 3,976,226.

The present invention relates to the manufacture by injection-moulding of articles composed of at least three substances in coatings one above the other. It also relates to a device for producing articles of this kind.

Techniques have already been proposed for injection moulding of articles composed of two substances or materials, these techniques consisting of injecting into a mould, through a single discharge channel, a first mass of material, and then, before the first mass is solidified, a second mass of material distinct from the first is injected and penetrates into the first mass, pushing it back towards the walls of the mould in such manner that the first mass of material constitutes the outer skin of the article while the second mass constitutes the core.

When the two materials utilized within the framework of this known method have compatible characteristics, sufficient cohesion is obtained between the body and the skin, and this technique has become essentially adopted for the manufacture of articles, the consituents of which have a sufficient number of points in common to permit of adequate cohesion between each other.

However, in the case where the two products employed have no chemical compatibility, the coupling between the two materials is only a mechanical contact of poor quality, and in certain cases even no attachment, even mechanical, exists between the two materials, the outer material having then only the function of a casing for the core.

It cannot be denied that in this case the two materials react in a different way to the conditions of the medium (mechanical, chemical, thermal) in which they are utilized, their incompatibility is liable to result in deformation or even definite damage of the articles in which they are incorporated.

Now, there is a large number of fields in which it would be advantageous to be able to associate materials of different families by a method of injection moulding similar to that referred to above.

In order to achieve this project, it is essential to provide, between the skin and the body of dissimilar characteristics, a coupling layer compatible with both the materials constituting the article, the presence of this layer making it possible to achieve physical and chemical homogeneity of the article.

In consequence, the invention thus relates to a method characterized in that there are successively injected into a mould through a single discharge channel, a measured quantity of a first material intended to form the skin of the article and then a measured quantity of a second material intended to form the intermediate layer, this second material penetrating into the first and pushing it back towards the walls of the mould, and finally a measured quantity of a third material intended to form the body and penetrating into the interior of the second material in order to push back the first material into contact with the mould, the third material being coated by the second and the second coated by the first.

According to another characteristic feature of the invention, the materials are introduced into the mould coaxially in order to effect a uniform distribution of the materials.

The method according to the invention has naturally an essential advantage in the case where the first and third materials injected are of such a nature that they do not or only imperfectly permit their mechanical or chemical association, the second material being then a material to ensure the coupling between the two other materials.

In addition, the invention relates to an injection moulding device or apparatus, the originality of which resides in the use of an injection nozzle comprising a single discharge channel opening on the side of the mould, this nozzle furthermore comprising at least three chambers separated from each other and coaxial, each chamber being connected to an independent supply circuit for the circulation of a material to be injected, each supply circuit comprising a plastification unit.

The outermost chamber preferably opens at the base of the discharge channel of the nozzle, and the innermost chamber at the upper portion of the channel, the intermediate chamber opening into the channel between the openings from the two other chambers.

As has already been stated, each of the above chambers is connected to a circuit for the supply of the material, the outermost chamber being coupled to the supply circuit for the material first injected, the intermediate chamber to the supply circuit of the second-injected material and the inner chamber to the third material.

According to a preferred form of embodiment, the inner chamber is a cylindrical passage arranged along the axis of the nozzle, and the two other chambers are passages of annular section concentric with the axial passage.

From the structural point of view, the nozzle according to the invention comprises a fixed body, possibly equipped with a hollow fixed sleeve, pierced with a channel mouth-to-mouth with the discharged channel in the mould, the internal cavity of the fixed sleeve receiving a second hollow sleeve in which is housed a third sleeve, also hollow, the second sleeve forming with the first a first annular chamber communicating with a first plastification unit, while the third sleeve forms with the second a second chamber communicating with a second plastification unit, the internal channel of the third sleeve communicating for its part with the third plastification unit.

The third sleeve is advantageously axially movable in the second, and this latter is also movable along its axis inside the fixed sleeve. It will be noted that alternatively there may be only two movable sleeves, directly housed in a suitable housing of the fixed body.

According to a preferred form of embodiment, the extremities of the sleeves are conical and rest on conical seatings of the outer sleeve of the fixed body respectively.

It will be understood that in consequence of this mobile arrangement, the injection into one of the chambers causes a displacement of one or both the movable sleeves and the closure of the other chambers. The result is that the actuation of one of the plastification units will cause, on the one hand the putting into communication of the corresponding chamber with the mould, and on the other hand the simultaneous closure of the other two chambers. In this way it is possible to effect the sequential injection provided by the method.

There will now be described by way of nonlimitative example, a preferred form of embodiment of the invention, reference being made to the accompanying drawings, in which:

FIG. 2 is a detail shown on a larger scale, of the nozzle system according to the invention.

Figure 1:
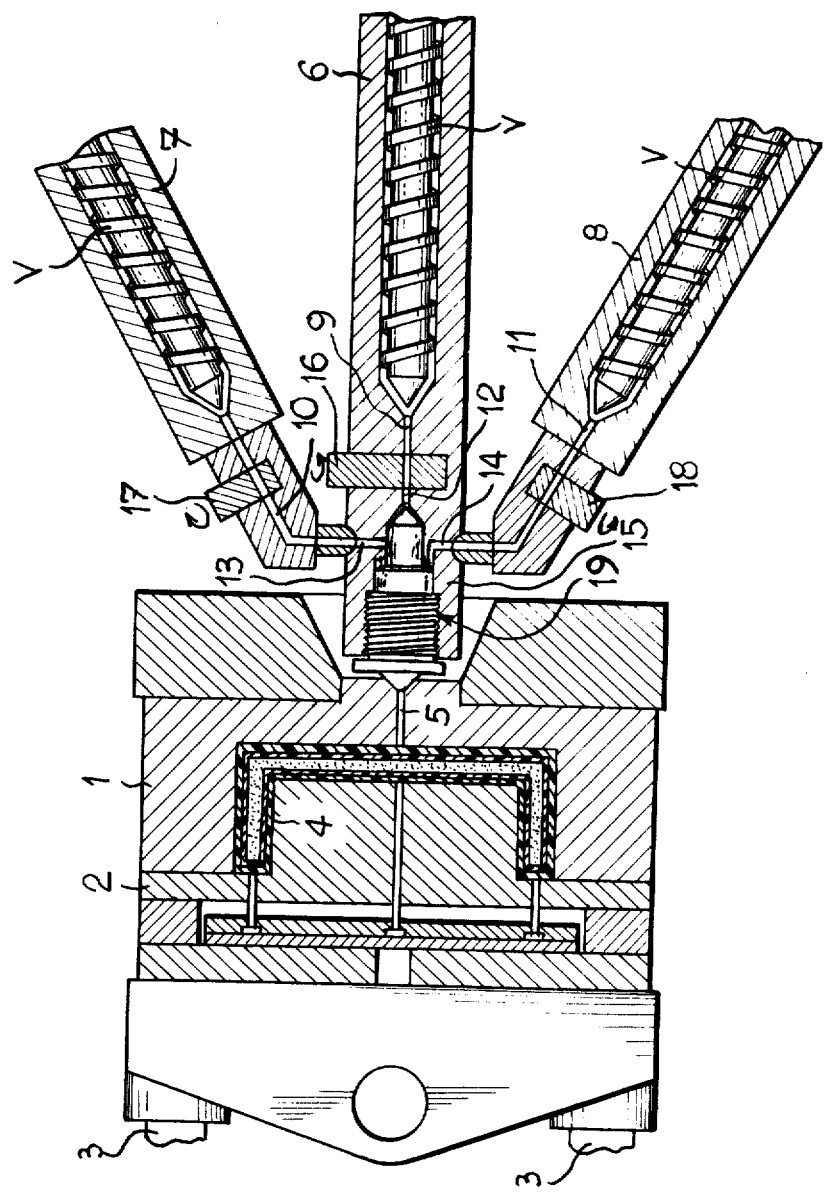
FIG. 1 is a diagrammatic cross-section of the injection head of a machine constructed according to the invention, with the mould shown in the closed position.

In FIG. 1 there has been shown at 1 the fixed part of a mould of an injection machine of generally conventional construction, and at 2 its moving portion mounted on guiding pillars 3, this moving portion being actuated in displacement by a conventional operating system with jacks, which has not been shown.

The parts 1 and 2 of the mould form with each other a cavity 4 in which the materials for the production of an article shown in cross-section in FIG. 1 are intended to be injected.

In the fixed portion of the mould is formed a single discharge channel 5, through which the various materials will be injected successively.

The references 6, 7 and 8 indicate the three plastification units utilized within the framework of the example shown. Each of these units comprises a plastification screw V rotating about its axis and fed with material by a hopper system (not shown). The screws V are respectively extended by channels 9, 10 and 11 which communicate with channels 12, 13 and 14 formed in a nozzle-supporting body indicated at 15 and supported by appropriate means (not shown) on the fixed portion 1 of the mould.

On the channels 9, 10 and 11 there are preferably interposed valves 16, 17 and 18 which effect the opening and closing of these channels; in the example illustrated, the valves are of the rotary cock type.

In the body 15 is housed a nozzle indicated generally by 19. This nozzle is constituted by a first hollow sleeve 20 fixed, for example by screwing, into the body 15. This first sleeve is terminated at its end turned towards the mould by a cone 21 mouth-to-mouth with the discharge channel 5. Internally, the sleeve 20 is pierced by a bore 22 terminating by a concial portion 23. The bore 22 communicates with the channel 5 through an axial hole 24. Inside the bore 22 of the sleeve 20 is housed a second sleeve 25. This sleeve is of generally tubular shape and terminates in a conical portion 26 intended to come into contact with the core 23 of the sleeve 20.

The sleeve 25 has a wide portion 27 in sliding contact with the bore 22 of the sleeve 20, and a portion 28 of smaller diameter forming an annular chamber 29 with the wall 22 of the sleeve 20. This chamber 29 communicates with the channel 14 of the plastification unit 8 by passages 30 bored in the sleeve 20, these passages 30 opening into an annular space 31 formed between the sleeve 20 and the body 15.

In addition, a third sleeve 32 is placed in the interior of the sleeve 25. The sleeve 32 has a head 33 in sliding contact with the internal wall of the bore of the sleeve 25, and a portion 34 of smaller diameter, defining with the internal wall of the sleeve 25 a chamber 35 which communicates through passages 36 pierced in the sleeve 25 with an annular space 37 formed between the sleeve 25 and the body 15. This space 37 is in constant communication with the channel 13 of the plastification unit 7.

As for the sleeve 25, the sleeve 32 is provided at its lower portion with a conical part 38 intended to come into contact with the corresponding conical part of the sleeve 25. Finally, the sleeve 32 is pierced axially with a channel 39 which is put into communication with the channel 12 of the plastification unit 6.

As can more clearly be seen from FIG. 2, the sleeves 25 and 32 are mounted in a movable manner in their respective housings, the upper surface 40 of the sleeve 25 being moved away in the position of rest from the apex 41 of the housing provided for it in the body 15; similarly, the conical top 42 of the sleeve 32 is moved away in the position of rest from the seating 43 provided in the body 15.

It will at once be understood that by virtue of this arrangement, when it is desired to inject into the mould the material coming from the plastification unit 6, this latter will be operated in such manner as to pass the material in the direction of the arrow $F_1$ which will apply to the sleeve 32 a pressure such that the whole of the nozzle is located in the position shown in FIG. 2. The material may then circulate in the direction of the arrows $F_1$, the circulation circuits of the other two materials being interrupted by the application of the lower seatings of the sleeves 32 and 26, against each other and against the seating 23 of the sleeve 20.

When the dose or certain quantity of material coming from the plastification unit 6 is sufficient, the valve 16 will be closed and for example the valve 17 of the plastification unit 7 will be opened. In this case, the material flowing in the direction of the arrow $F_2$ will penetrate into the space 37, into the passage 36 and into the chamber 35, applying the sleeve 25 against the seating 23 of the sleeve 20, but on the contrary raising the internal sleeve 32 so as to apply it against the upper seating 43 and in the meantime liberating a passage between the conical portion 26 and 38.

The valve 17 will then be closed and the valve 18 of the plastification unit 8 will be opened in such manner that the material will flow in the direction of the arrow $F_3$ into the space 31, into the passages 30 and into the chamber 29, the pressure of the material then lifting at the same time the movable sleeves 32 and 25 and freeing a passage between the conical portions 26 and 23. What I claim is:

1. A method for manufacturing by injection molding in a mold of an article having a core, a skin and at least an intermediate layer embedding said core and being covered by said skin, said method comprising the steps of successively
    injecting into the mold, along the direction of the axis of a discharge channel connected to the mold, a quantity of a first material intended to form the skin of the article,
    stopping the injection of said first material in the channel,
    injecting along the same axis a quantity of a second material into the mold intended to form the intermediate layer of the article, said quantity of second material penetrating into the first material,
    stopping the injection of said second material in the channel,
    and injecting along the same axis a quantity of a third material into the mold intended to form the core of the article, said quantity of third material penetrating into the quantity of second material, the second material interposed between said first and third materials being of uniform thickness.

2. The method of claim 1 further including the step of injecting at least one of the materials into the channel from the periphery of said channel and in a radially inclined direction towards the axis of said channel.

* * * * *